United States Patent
Rose et al.

(10) Patent No.: US 9,279,387 B2
(45) Date of Patent: Mar. 8, 2016

(54) NOZZLE WITH GUIDING DEVICES

(71) Applicant: Rolls-Royce Deutschland Ltd & Co KG, Blankenfelde-Mahlow (DE)

(72) Inventors: Marco Rose, Freiberg (DE); Rene Spieweg, Berlin (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 231 days.

(21) Appl. No.: 14/072,073

(22) Filed: Nov. 5, 2013

(65) Prior Publication Data

US 2014/0124289 A1   May 8, 2014

(30) Foreign Application Priority Data

Nov. 8, 2012 (DE) .................. 10 2012 220 360

(51) Int. Cl.
F02K 1/00 (2006.01)
F02K 1/46 (2006.01)
F02K 1/38 (2006.01)
F02K 1/48 (2006.01)

(52) U.S. Cl.
CPC . *F02K 1/46* (2013.01); *F02K 1/386* (2013.01); *F02K 1/48* (2013.01); *Y02T 50/671* (2013.01)

(58) Field of Classification Search
CPC ............ F02K 1/386; F02K 1/36; F02K 1/46; F02K 1/48; F05B 2260/96; B64D 33/04; B64D 33/06
See application file for complete search history.

(56) References Cited

U.S. PATENT DOCUMENTS

| | | | |
|---|---|---|---|
| 3,982,696 A | 9/1976 | Gordon | |
| 4,487,017 A * | 12/1984 | Rodgers | 60/262 |
| 4,813,230 A | 3/1989 | Braithwaite | |
| 5,884,472 A * | 3/1999 | Presz et al. | 60/262 |
| 6,308,898 B1 | 10/2001 | Dorris et al. | |
| 6,360,528 B1 | 3/2002 | Brausch et al. | |
| 6,487,848 B2 | 12/2002 | Zysman et al. | |
| 6,505,706 B2 | 1/2003 | Tse | |
| 6,532,729 B2 | 3/2003 | Martens | |
| 6,578,355 B1 | 6/2003 | Mundt | |
| 6,612,106 B2 | 9/2003 | Balzer | |
| 8,307,659 B2 | 11/2012 | Rose et al. | |
| 2002/0125340 A1 | 9/2002 | Birch et al. | |
| 2002/0164249 A1 | 11/2002 | Strange, Jr. et al. | |

(Continued)

FOREIGN PATENT DOCUMENTS

| | | |
|---|---|---|
| DE | 3826438 | 3/1989 |
| DE | 19952797 | 5/2001 |
| DE | 102007063018 | 6/2009 |
| EP | 0635632 | 1/1995 |
| EP | 0913567 | 5/1999 |
| EP | 0913568 | 5/1999 |
| EP | 0984152 | 3/2000 |
| EP | 2072793 | 6/2009 |

(Continued)

*Primary Examiner* — Gerald L Sung
(74) *Attorney, Agent, or Firm* — Timothy J. Klima; Shuttleworth & Ingersoll, PLC (57) ABSTRACT

A nozzle has a nozzle surface area and a nozzle rim, on which first and second guiding devices are alternatingly provided in the circumferential direction, where the first guiding devices are of the nozzle-type design and the second guiding devices are of the diffuser-type design. The first guiding devices each have a first azimuthal guide wall and two wall elements. The second guiding devices each have a second azimuthal guide wall and two wall elements. A wall element connects a first guiding device and a second guiding device. At least some of the first azimuthal guide walls of the first guiding device and at least some of the second azimuthal guide walls of the second guiding device have differing axial lengths, so that first and second trailing edges thereof have differing axial positions.

22 Claims, 5 Drawing Sheets

(56) References Cited

U.S. PATENT DOCUMENTS

| | | |
|---|---|---|
| 2003/0231777 A1 | 12/2003 | Butler et al. |
| 2004/0140397 A1* | 7/2004 | Dun ............................. 244/55 |
| 2010/0032497 A1* | 2/2010 | Rose et al. ............... 239/265.11 |
| 2010/0293958 A1 | 11/2010 | Girgis et al. |

FOREIGN PATENT DOCUMENTS

| | | |
|---|---|---|
| GB | 2289921 | 12/1995 |
| GB | 2355766 | 5/2001 |
| GB | 2372779 | 9/2002 |
| WO | 2008025178 | 3/2008 |

* cited by examiner

NOZZLE WITH GUIDING DEVICES

CROSS-REFERENCE TO RELATED APPLICATION

This application claims the benefit of German Patent Application No. 10 2012 220 360.5 filed on Nov. 8, 2012 and is fully incorporated herein by reference.

BACKGROUND

This invention relates to a nozzle with guiding devices. A nozzle of this type is used for example in a gas turbine, in particular an aircraft engine, or in a burner, an ejector or a mixing nozzle of a process engineering system.

During take-off of an aircraft, the propulsive jet represents a considerable source of sound. Contributing to the generation of sound are stable and coherent swirl structures that form in the shear layers of the free jet. Numerous passive and active measures are known for reducing the jet noise.

The generic EP 2 072 793 A2 describes a nozzle with guiding elements, on the rim of which nozzle diffuser-type and nozzle-type guiding elements are alternating provided. The guiding elements form here trapezoids alternately converging and diverging in the flow direction. These guiding elements impart a swirl to the outflowing medium at the nozzle rim where the outflowing medium meets the surrounding medium. The resultant axial and radial swirls weaken the stable, coherent and noise-generating swirl structures and thus lead to reduced noise generation in the propulsive jet.

There is an ongoing need to provide a further reduction of the jet noise from aircraft while at the same time keeping aerodynamic losses low.

SUMMARY

An object underlying the present invention is to provide a nozzle with guiding elements that further reduce the sound emissions generated by the propulsive jet, while at the same time keeping aerodynamic losses low.

The solution in accordance with an exemplary embodiment of the invention therefore provides a nozzle with a nozzle surface area and a nozzle rim on which first and second guiding devices are alternately arranged in the circumferential direction. The first guiding devices are designed nozzle-like and form an open, converging duct. The second guiding devices are designed diffuser-like and form an open, diverging duct. To do so, the first guiding devices each have a first azimuthal guide wall and two guiding elements, with the first azimuthal guide wall forming a first trailing edge and two first edges to the wall elements. In the same way, the second guiding devices each have a second azimuthal guide wall and two guiding elements, with the second azimuthal guide wall forming a second trailing edge and two edges to the wall elements.

Each wall element connects a first guiding device and a second guiding device while forming part of both guiding devices. It is the case here that each wall element has a first edge to one of the first guide walls, a second edge to one of the second guide walls and a front-side trailing edge. The two edges of a wall element diverge in the axial direction.

It is provided in accordance with a first exemplary aspect of the invention that in a nozzle of this type, at least some of the first azimuthal guide walls of the first guiding device and some of the second azimuthal guide walls of the second guiding device have differing axial lengths, so that their first and second trailing edges have differing axial positions.

It is provided in accordance with a second exemplary aspect of the invention that in a nozzle of this type, at least some of the first trailing edges of the first azimuthal guide walls and/or at least some of the second trailing edges of the second azimuthal guide walls run obliquely to the circumferential direction.

In both cases, oblique and cut-back trailing edges (of the first/second guiding devices and/or wall elements) are provided. These effect a higher spatial variance in the direction of the swirl intensity vector for the outgoing swirls, thus leading to a reduction in the intensity of the large, stable and coherent swirls. The action mechanism for jet noise reduction is thus improved by the solution in accordance with the invention, while the weakening of the large swirl structures, which are coherent in the circumferential direction, leads to reduced noise generation in the jet.

The solution in accordance with the invention permits an efficient reduction of the low-frequency noise, while the high-frequency noise experiences little or no increase. At the same time, the flow losses are minimized by an optimized shape of the wall elements of the guiding devices. The solution in accordance with the invention is furthermore sturdy, weight-neutral and requires only low maintenance effort. It needs no moving parts, no control device and no separate energy supply, thus also making it inexpensive.

The nozzle in accordance with the invention can be used for all nozzle types, in particular also for a nozzle having a core flow nozzle and a bypass flow nozzle. The guiding devices can be an integral part of the nozzle or be fastened to the nozzle surface area subsequently as a retrofit kit.

In an exemplary embodiment of the first aspect of the invention, in which first and second guiding devices have differing axial lengths, the trailing edges of the first and second guide walls run in the circumferential direction, i.e. perpendicular to the nozzle main axis/main flow direction. The azimuthal guide walls of the first and second guiding devices have differing lengths, so that their trailing edges are located at differing axial positions, which however generally run in the azimuthal direction, i.e. in the circumferential direction.

Accordingly the front-side trailing edges of the wall elements, which connect the adjacent guide walls of a first and a second guiding device, run obliquely in the sense that they have an axial and a radial component.

It is pointed out that according to the first aspect of the invention, not all of the first azimuthal guide walls and of the second azimuthal guide walls have to have a differing axial length. Nor is it necessary for all the first azimuthal guide walls, considered separately, to have the same axial length, and for all of the second azimuthal guide walls, considered separately, to have the same axial length. The first azimuthal guide walls can also have differing axial lengths where for example two or three differing axial lengths of the first azimuthal guide walls are achieved in a regular sequence. The same applies for the second azimuthal guide walls. It is obviously also within the scope of the present invention that the first azimuthal guide walls, considered separately, all have the same axial length and that all of the second azimuthal guide walls, considered separately, also have the same length.

According to a design variant of the second aspect of the invention, where at least some of the first trailing edges and/or at least some of the second trailing edges run obliquely to the circumferential direction, the trailing edges run at an angle of up to +/−45° to the nozzle main axis main flow direction.

In the second aspect of the invention, the front-side trailing edges of adjacent wall elements, which each connect a first and a second guiding device, are located at differing axial positions. The azimuthal trailing edges of the first and second azimuthal guide walls run obliquely to the circumferential direction and thus result in a variation in the length (i.e. the axial extent) of an azimuthal guide wall in the circumferential direction.

The wall elements, which each connect a first guiding device and a second guiding device to one another, run in accordance with one design variant in the radial direction, i.e. they are aligned perpendicular to the nozzle surface area. However, it can also be provided in alternative design variants that the wall elements run obliquely, having a radial component and a component in the circumferential direction. An oblique arrangement of the wall elements leads to a narrowing or widening in the radial direction of the ducts provided by the first and second guiding devices. This can lead to additional swirling at the nozzle rim.

An exemplary design variant of the present invention provides that the wall elements have straight edges and are accordingly designed as triangles. These triangles extend here from a starting point adjoining the nozzle surface area up to the front-side trailing edge. It can however be provided in alternative exemplary embodiments that the wall elements are provided with a curvature, where the ducts formed by the first and second guiding devices widen or narrow in the axial direction not in a linear, but for example in an arched form.

In the nozzle in accordance with the invention, adjacent wall elements converge and diverge alternately and in pairs in the axial direction. A wall element studied thus forms with its one neighbour a convergent duct and with its other neighbour a divergent duct.

The first and the second guide walls can be inclined relative to the flow direction at the nozzle rim in different ways. To do so, it can in particular be provided that the first guide walls are inclined radially outwards and the second guide walls are inclined radially inwards, or vice versa. This means that the guiding devices of the nozzle-type design are aligned inwards, i.e. to the jet, and the diffuser-type guiding devices outwards to the surrounding flow, or that the diffuser-type guiding devices are aligned inwards i.e. to the jet, and the nozzle-type guiding devices outwards to the surrounding flow.

BRIEF DESCRIPTION OF THE DRAWINGS

The present invention is described in the following in more detail with reference to the figures of the accompanying drawing, showing several exemplary embodiments.

DETAILED DESCRIPTION

Figure 3:
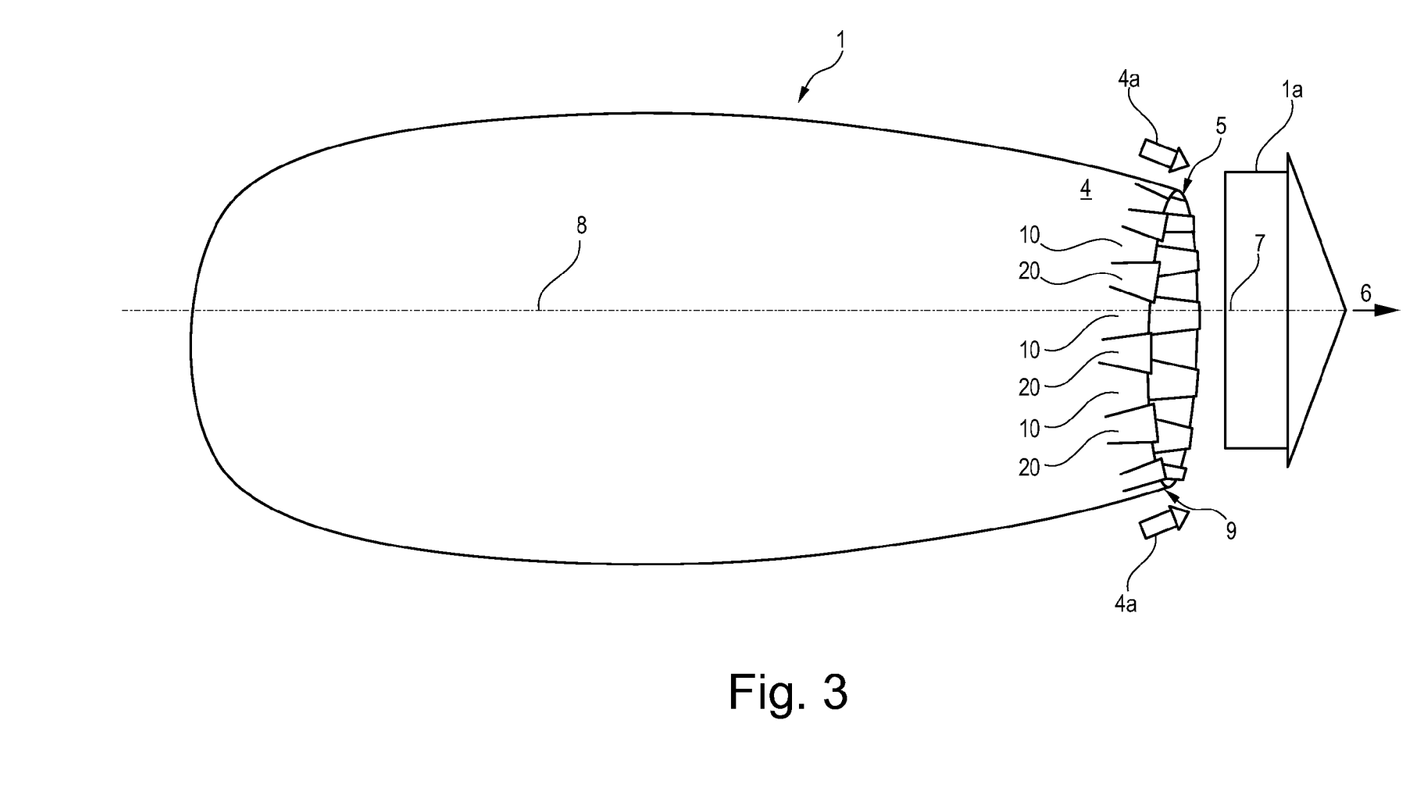
FIG. 3 shows a perspective and schematic view of a first exemplary embodiment of a nozzle with first and second guiding devices in accordance with the state of the art.
Figure 4:
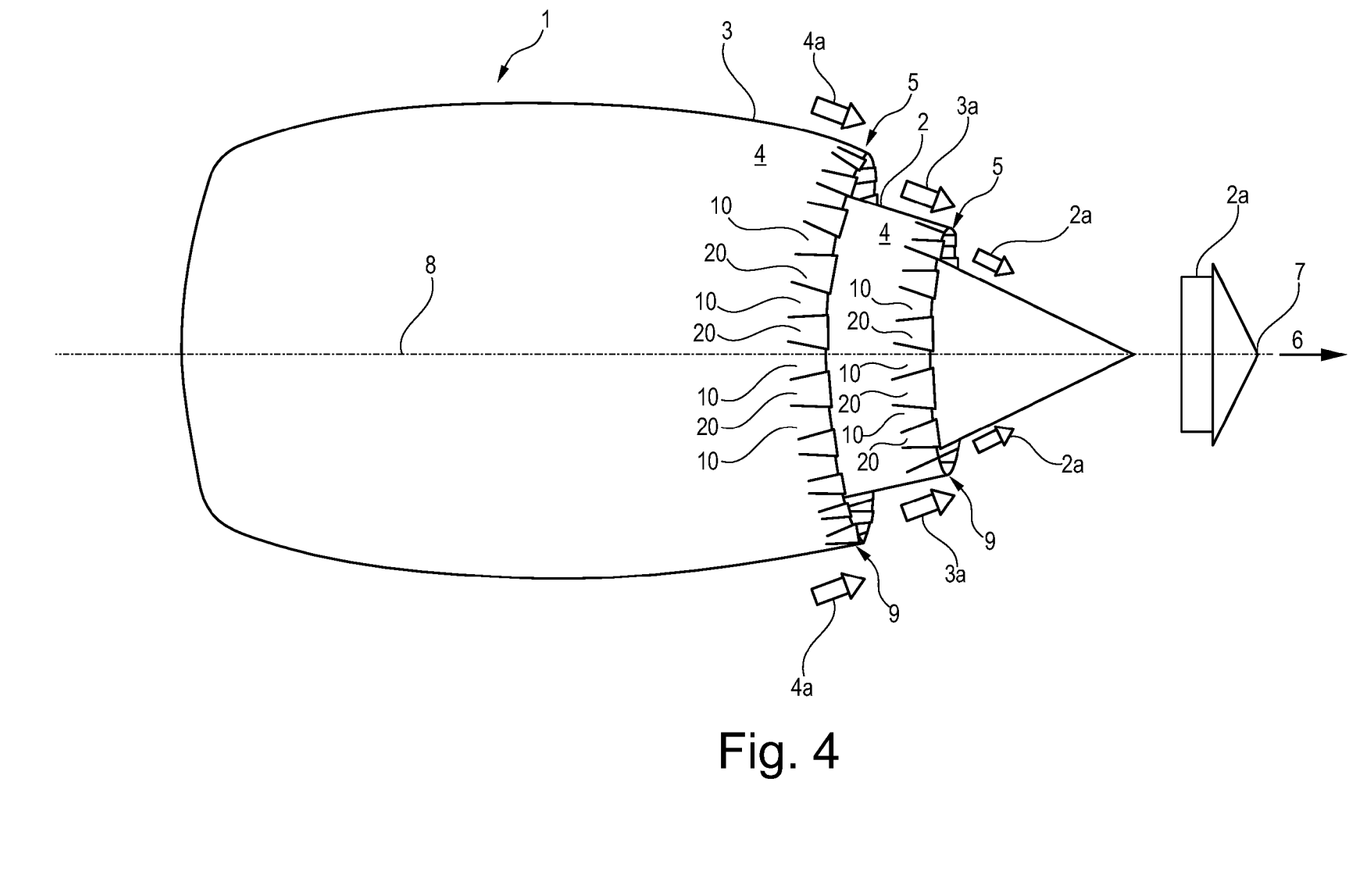
FIG. 4 shows a perspective and schematic view of a second exemplary embodiment of a nozzle in accordance with the state of the art.

For a better understanding of the background of the present invention, two embodiments of a nozzle with first and second guiding devices in accordance with the state of the art are initially explained on the basis of FIGS. 3 and 4.

FIG. 3 shows a nozzle 1 with a nozzle surface area 4 as well as first guiding devices 10 and second guiding devices 20 provided on a nozzle rim with a jet outlet edge 5. The first guiding, devices 10 converge in the flow direction 6 and are inclined radially inwards, while the second guiding devices 20 diverge in the flow direction 6 and are inclined radially outwards. A reversed design is also possible. The jet axis 7 forms in the flow direction 6 an extension of the center line 8 of the nozzle 1. The center line 8 of the nozzle can be identical to the center line of the turbine (as shown), but can also slightly differ from it.

In operation, a propulsive jet 1a exits the nozzle at the jet outlet edge. An outer flow 4a passes along the nozzle surface area 4.

FIG. 4 shows a nozzle 1 including a core flow nozzle 2 and a bypass flow nozzle 3. The core flow nozzle 2 and the bypass flow nozzle 3 each have a nozzle surface area 4 with a jet outlet edge 5 as well as first guiding devices 10 and second guiding devices 20 at nozzle rims 9 with associated jet outlet edges 5. As in FIG. 3, the first guiding devices 10 converge in the flow direction 6 and are inclined radially inwards, while the second guiding devices 20 diverge in the flow direction 6 and are inclined radially outwards. Alternatively, the first guiding devices 10 are inclined radially outwards and the second guiding devices 20 radially inwards. The jet axis 7 forms in the flow direction 6 an extension of the center line 8 of the nozzle 1. The center line 8 of the nozzle can be identical to the center line of the turbine (as shown), but can also slightly differ from it.

In operation, a hot core flow 2a exits the core flow nozzle 2 in the exemplary embodiment of FIG. 4. A cold bypass flow 3a exits the bypass flow nozzle 3. The outer flow 4a passes along the nozzle surface area 4 of the bypass flow nozzle 3.

An arrangement corresponding to FIGS. 3 and 4 is described in EP 2 072 793 A2, to which reference is made additionally.

Figure 1:
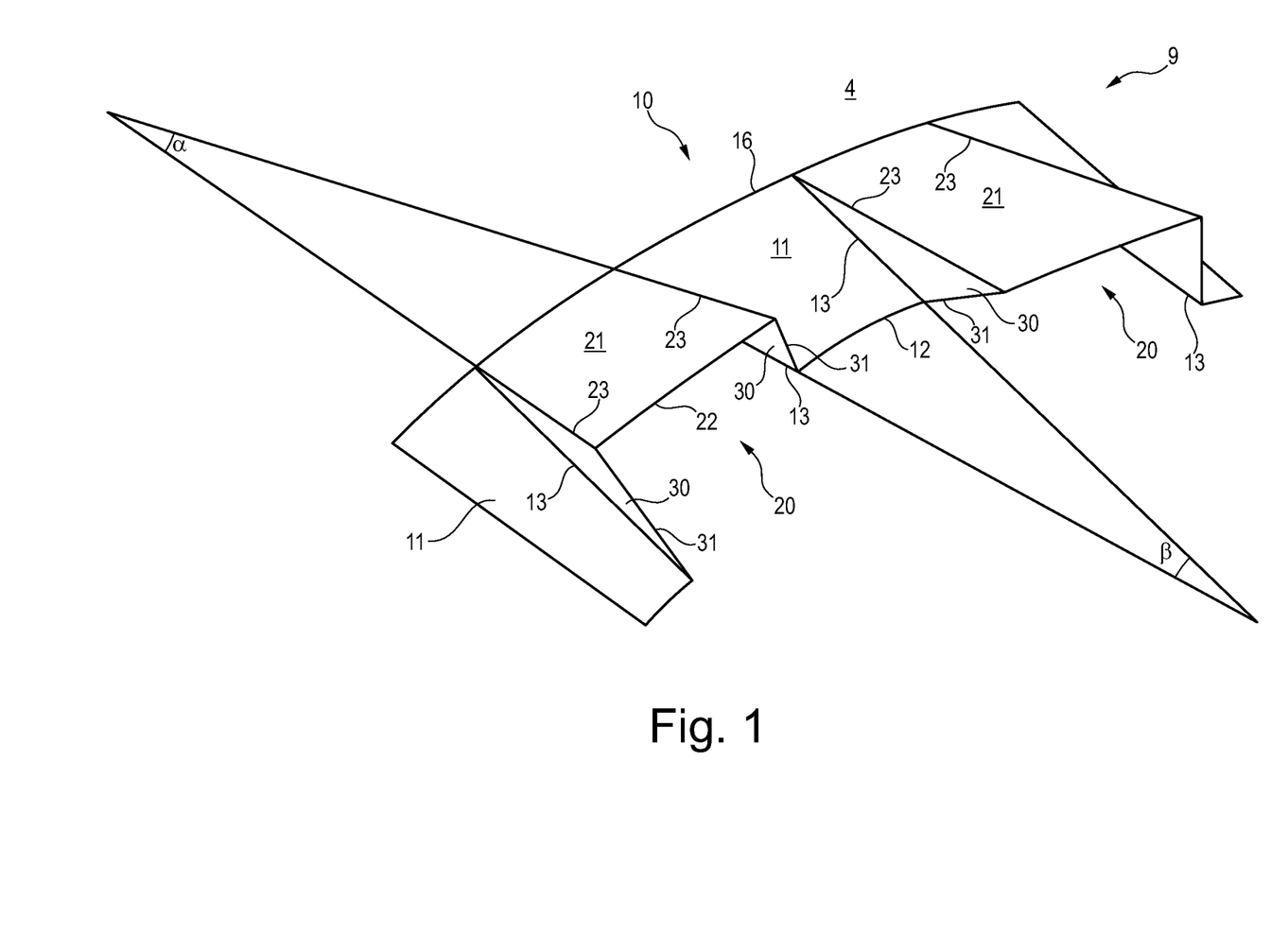
FIG. 1 shows a first exemplary embodiment of first and second guiding devices of a nozzle in accordance with the present invention.

FIG. 1 shows a first exemplary embodiment of a nozzle rim designed in accordance with the invention, having first nozzle-type guiding devices 10 and second diffuser-type guiding devices 20, which are designed for improving the action mechanism for jet noise reduction in a different way than in accordance with FIGS. 3 and 4.

In accordance with FIG. 1, the nozzle rim 9 is formed from first guiding devices 10 and second guiding devices 20. The first guiding devices 10 form a nozzle-type duct and the second guiding devices 20 a diffuser-type duct.

To do so, the first guiding devices 10 each include a (first) circumferentially extending azimuthal guide wall 11 and two adjoining wall elements 30 adjacent to it in the circumferential direction. The azimuthal guide wall 11 is delimited here by four limiting lines or edges. A first edge running azimuthally and axially at the front when seen in the flow direction is formed by an edge 16 running in the circumferential direction, adjoining the nozzle surface area 4 and defining the start of the guiding elements 10, 20 in the axial direction. A second edge running azimuthally and axially at the rear when seen in the flow direction is formed by a (first) trailing edge 12. The first guiding device 10 furthermore includes two lateral edges 13, i.e. spaced apart in the circumferential direction. The edges 13 form edges to the wall elements 30 and at the same time limits to the azimuthal guide wall 11. They converge corresponding to a convergence angle $\beta$, with the convergence angle $\beta$ being for example between 0° and 7°

The second guiding devices 20 also include a (second) circumferentially extending azimuthal guide wall 21 and two wall elements 30. The azimuthal guide wall 21 is here defined by four limiting lines or edges. A first edge, which is axially at the front, is formed by the edge 16 running in the circumferential direction. A second edge, which is axially at the rear, is formed by a (second) trailing edge 22. Furthermore two lateral edges 23 are provided to the wall elements 30. The two edges 23 diverge corresponding to a divergence angle α, with the divergence angle α being for example between 0° and 7°.

The wall elements 30 are triangular and are delimited by the edges 13, 23 and 31. In the exemplary embodiment shown, they are flat in themselves, but alternatively can also be designed arched or curved in themselves.

The wall elements 30 each connect a first guiding device 10 and a second guiding device 20 to one another and are also part of both guiding devices 10, 20 in that each wall element 30 has a first edge 13 to one of the first guide walls 11 and a second edge 23 to one of the second guide walls 21. Each wall element 30 furthermore includes a front-side trailing edge 31. The two edges 13, 23 of a wall element diverge here downstream in the axial direction.

It is pointed out that the first guiding devices 10 are inclined radially inwards and the second guiding devices 20 radially outwards relative to the flow direction. However, an opposite alignment of the guiding devices 10, 20 is also possible.

The azimuthal guide walls 11 of the first guiding devices 10 and the azimuthal guide walls 21 of the second guiding devices 20 have in accordance with the exemplary embodiment of FIG. 1 at least partially a differing axial length. This means that at least some of the trailing edges 12 of the first guiding devices 10 and at least some of the second trailing edges 22 of the second guiding devices 20 have a different axial position. Here the trailing edges 12, 22 of the first and second guiding devices each extend in the circumferential direction.

Depending on the differing axial positions of the first and second trailing edges 12, 22, at least some of the front-side trailing edges 31 of the wall elements 30 run obliquely having an axial and a radial component, as can be seen from FIG. 1.

It is pointed out that a change in the axial length can affect all of the first and second guiding devices 10, 20, but does not have to do so. For example, it is provided in the exemplary embodiment of FIG. 1 that the guide wall 21, arranged at the rear in FIG. 1, has a first axial length while the guide wall 11 adjoining it in the counter-clockwise direction has by contrast a shorter axial length, so that the front-side trailing edge 31 of the wall element 30 provided between them runs obliquely. The azimuthal guide wall 21 of a second guiding device adjoining this azimuthal guide wall 11 in the counter-clockwise direction is by contrast not axially offset relative to this guide wall 11. An axial offset is only present again relative to the first guiding device 11 then adjacent in the counter-clockwise direction.

It can therefore be provided, for example, that a change in the axial length is not made for every guiding device 10, 20, but only for every n-th guiding device, where n is greater than or equal to two.

A change in the axial length can also be effected non-periodically, and to do so be achieved for example in a random manner or following a certain number sequence.

Overall, a nozzle rim 9 is provided in which the front-side trailing edges 31 of at least some of the wall elements 30 run obliquely, and the nozzle rim 9 undergoes an additional variation due to the differing axial lengths of the azimuthal guide walls 11, 21. As a result of this, local acceleration and deceleration of the flow exiting from the nozzle rim 9 in the area of the nozzle outlet edge and a variation of the axial speed in the circumferential direction are achieved to an increased degree. This generates axial and radial swirls downstream of the nozzle, which interact with the stable annular swirl and which finally deform and dissipate. This ensures an increased momentum exchange, i.e. an improved and homogeneous mixing of the inner flow 1a, 2a, 3a and the outer flow 3a, 4a (cf. FIGS. 3, 4). The large, low-frequency and noise-generating swirl structures are broken up into small swirl structures, with the high-frequency noise they emit being better absorbed atmospherically.

Figure 2:
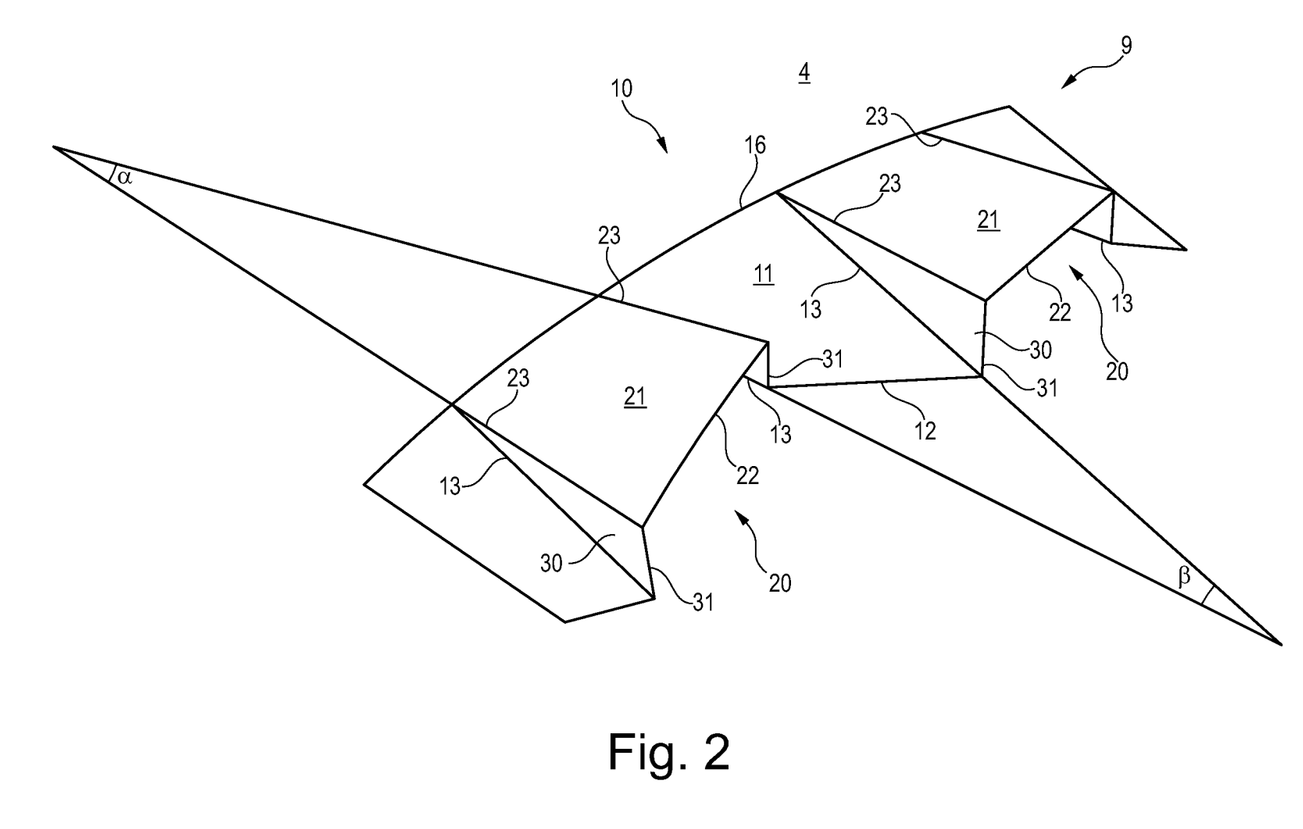
FIG. 2 shows a second exemplary embodiment of first and second guiding devices of a nozzle in accordance with the present invention.

FIG. 2 shows a further exemplary embodiment of a nozzle rim with convergent and divergent first and second guiding devices 10, 20. As regards the structure of the individual guiding devices 10, 20, reference is made here to the statements concerning FIG. 1.

Unlike in the exemplary embodiment of FIG. 1, it is provided in the exemplary embodiment of FIG. 2 that at least some of the first trailing edges 12 of the azimuthal guide walls 11 and/or at least some of the second trailing edges 22 of the second azimuthal guide walls 21 run obliquely to the circumferential direction. This achieves a variation in the axial extent of these azimuthal walls 11, 21 and hence of the corresponding diffuser-like ducts and nozzle-like ducts that provide the second and first guiding devices 10, 20.

The trailing edges 12, 22 are for example aligned obliquely to the nozzle main axis/main flow direction at an angle less than/equal to 45°.

The trailing edges 12, 22 run back and forth in a zigzag line defining the jet outlet edge of the nozzle rim. This zigzag line can be of regular form with fixed angles and lengths of the trailing edges 12, 22, or alternatively of irregular form with changing angles and/or lengths of the trailing edges 12, 22.

In the exemplary embodiment of FIG. 2 too, additional obliquely running edges are provided which improve the action mechanism for jet noise reduction, where the local acceleration and deceleration of the flow exiting from the nozzle rim 9 can be even more intense in the area of the jet outlet edges.

The exemplary embodiments of FIGS. 1 and 2 can also be combined. For example, it can be provided in the exemplary embodiment of FIG. 1 that the trailing edges 12, 22 provided therein likewise run obliquely to the circumferential direction.

With regard to the exemplary embodiment in FIG. 2, it is pointed out that here too an oblique course of the trailing edges does not have to be present for every one of the guiding devices 10, 20 it is also within the scope of the invention to provide an oblique course of this type only in some of the guiding devices 10, 20, where a periodic or non-periodic arrangement and sequence is possible. It can also be provided that the individual trailing edges 12, 22 of the individual guiding devices 10, 20 have differing angles with regard to their oblique position relative to the circumferential direction.

The exemplary embodiments of FIGS. 1 and 2 can be varied such that the wall elements 30 do not, as shown in FIGS. 1 and 2, run in the radial direction, i.e. are perpendicular to the nozzle surface area 4, but instead have an oblique design with a radial component and a component in the circumferential direction.

Figure 5:
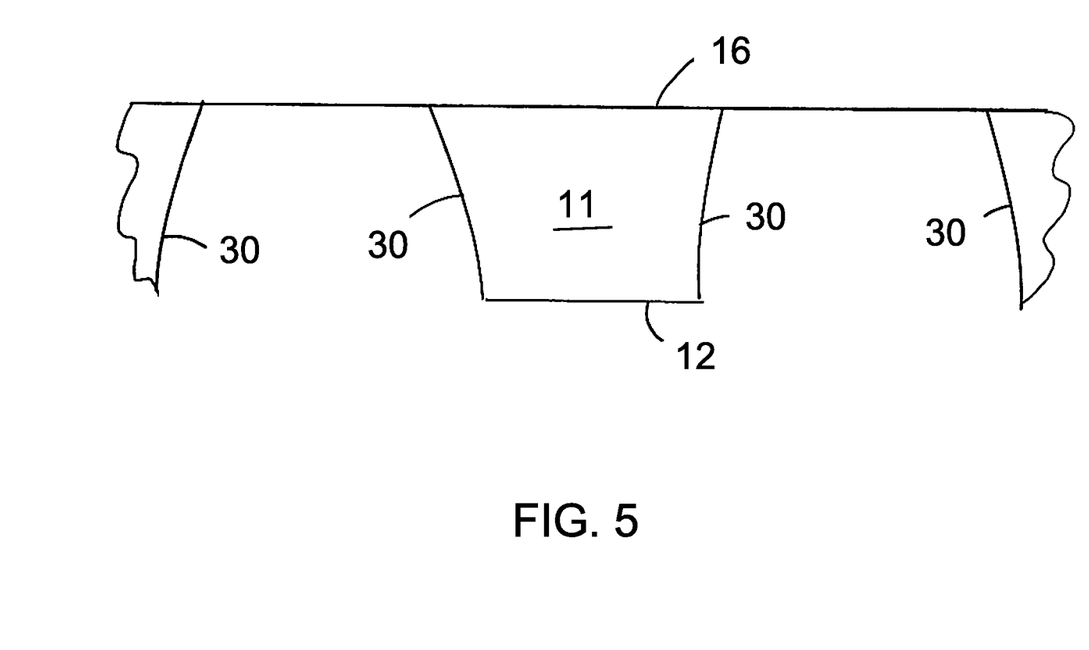
FIG. 5 shows a partial schematic view looking radially inward of an embodiment of the nozzle.

The invention is not restricted in its design to the exemplary embodiments set forth above, which must be understood only as examples. The angle and size ratios as shown of the first and second guiding devices must therefore only be understood as examples. It can also be provided that unlike as shown in FIGS. 1 and 2, the wall elements 30 are not designed in triangular form, but have an arched or curved course in the axial direction (see FIG. 5). This permits further variation in the design of the open flow ducts provided by the guiding devices 10, 20.

The invention claimed is:

1. A nozzle comprising:
   a nozzle surface area and a nozzle rim,
   first and second guiding devices alternatingly provided on the nozzle rim in a circumferential direction,
   a plurality of wall elements,
   wherein the first guiding devices have a converging shape in a flow direction,
   wherein the second guiding devices have a diffusing shape in the flow direction,
   wherein the first guiding devices each have a first guide wall circumferentially extending between two first adjacent ones of the wall elements, with the first guide wall forming a first trailing edge and two first edges to the two first adjacent ones of the wall elements,
   wherein the second guiding devices each have a second guide wall circumferentially extending between two second adjacent ones of the wall elements, with the second guide wall forming a second trailing edge and two second edges to the two second adjacent ones of the wall elements, and
   wherein each wall element connects a first guiding device and a second guiding device while forming part of both guiding devices, with each wall element having a first edge to one of the first guide walls, a second edge diverging from the first edge in an axial direction toward one of the second guide walls and a trailing edge,
   wherein at least some of the first guide walls of the first guiding devices and at least some of the second guide walls of the second guiding devices have different axial lengths, so that the first and second trailing edges have different axial positions;
   wherein the wall elements have a curved course in the axial direction.

2. The nozzle in accordance with claim 1, wherein the trailing edges of the first and second guide walls run in the circumferential direction.

3. The nozzle in accordance with claim 2, wherein at least some of the trailing edges of the wall elements run obliquely to the circumference and have an axial and a radial component.

4. The nozzle in accordance with claim 1, wherein the wall elements are aligned in a radial direction.

5. The nozzle in accordance with claim 1, wherein the wall elements run obliquely to the circumference and have a radial component and a component in the circumferential direction.

6. The nozzle in accordance with claim 1, wherein adjacent wall elements converge and diverge alternately and in pairs in the axial direction.

7. The nozzle in accordance with claim 1, wherein each of the first and the second guide walls have inclinations relative to the flow direction at the nozzle rim and the inclinations of the first guide walls are different from the inclinations of the second guide walls.

8. The nozzle in accordance with claim 1, wherein the first guide walls are inclined radially outwards and the second guide walls are inclined radially inwards, or vice versa.

9. The nozzle in accordance with claim 1, wherein at least one chosen from the first guiding devices and the second guiding devices are made from segments of the nozzle surface area.

10. The nozzle in accordance with claim 1, wherein at least one chosen from the first guiding devices and the second guiding devices are provided as a retrofit kit and fastened to the nozzle surface area.

11. A nozzle comprising:
    a nozzle surface area and a nozzle rim,
    first and second guiding devices alternatingly provided on the nozzle rim in a circumferential direction,
    a plurality of wall elements,
    wherein the first guiding devices have a converging shape in a flow direction,
    wherein the second guiding devices have a diffusing shape in the flow direction,
    wherein the first guiding devices each have a first guide wall circumferentially extending between two first adjacent ones of the wall elements, with the first guide wall forming a first trailing edge and two first edges to the two first adjacent ones of the wall elements,
    wherein the second guiding devices each have a second guide wall circumferentially extending between two second adjacent ones of the wall elements, with the second guide wall forming a second trailing edge and two second edges to the two second adjacent ones of the wall elements, and
    wherein each wall element connects a first guiding device and a second guiding device while forming part of both guiding devices, with each wall element having a first edge to one of the first guide walls, a second edge diverging from the first edge in an axial direction toward one of the second guide walls and a trailing edge,
    wherein at least one chosen from the first trailing edges of the first guide walls and at least some of the second trailing edges of the second guide walls run obliquely to the circumferential direction;
    wherein at least some of the first and second trailing edges run at an angle of less than or equal to +/−45° to a nozzle main axis.

12. The nozzle in accordance with claim 11, wherein at least some of the trailing edges of adjacent wall elements have a different axial position.

13. The nozzle in accordance with claim 11, wherein the wall elements are aligned in a radial direction.

14. The nozzle in accordance with claim 11, wherein the wall elements run obliquely to the circumference and have a radial component and a component in the circumferential direction.

15. The nozzle in accordance with claim 11, wherein the wall elements have straight edges and are shaped as triangles.

16. The nozzle in accordance with claim 11, wherein the wall elements have a curved course in the axial direction.

17. The nozzle in accordance with claim 11, wherein adjacent wall elements converge and diverge alternately and in pairs in the axial direction.

18. The nozzle in accordance with claim 11, wherein each of the first and the second guide walls have inclinations relative to the flow direction at the nozzle rim and the inclinations of the first guide walls are different from the inclinations of the second guide walls.

19. The nozzle in accordance with claim 11, wherein the first guide walls are inclined radially outwards and the second guide walls are inclined radially inwards, or vice versa.

20. The nozzle in accordance with claim 11, wherein at least one chosen from the first guiding devices and the second guiding devices are made from segments of the nozzle surface area.

21. The nozzle in accordance with claim 11, wherein at least one chosen from the first guiding devices and the second guiding devices are provided as a retrofit kit and fastened to the nozzle surface area.

22. A nozzle comprising:
a nozzle surface area and a nozzle rim,
first and second guiding devices alternatingly provided on the nozzle rim in a circumferential direction,
a plurality of wall elements,
wherein the first guiding devices have a converging shape in a flow direction,
wherein the second guiding devices have a diffusing shape in the flow direction,
wherein the first guiding devices each have a first guide wall circumferentially extending between two first adjacent ones of the wall elements, with the first guide wall forming a first trailing edge and two first edges to the two first adjacent ones of the wall elements,
wherein the second guiding devices each have a second guide wall circumferentially extending between two second adjacent ones of the wall elements, with the second guide wall forming a second trailing edge and two second edges to the two second adjacent ones of the wall elements, and
wherein each wall element connects a first guiding device and a second guiding device while forming part of both guiding devices, with each wall element having a first edge to one of the first guide walls, a second edge diverging from the first edge in an axial direction toward one of the second guide walls and a trailing edge,
wherein at least one chosen from the first trailing edges of the first guide walls and at least some of the second trailing edges of the second guide walls run obliquely to the circumferential direction;
wherein the wall elements have a curved course in the axial direction.

* * * * *